May 13, 1930.                F. C. FERNANDEZ                1,758,567
           METHOD AND APPARATUS FOR MAKING FROZEN CONFECTIONS
                          Filed Aug. 12, 1927
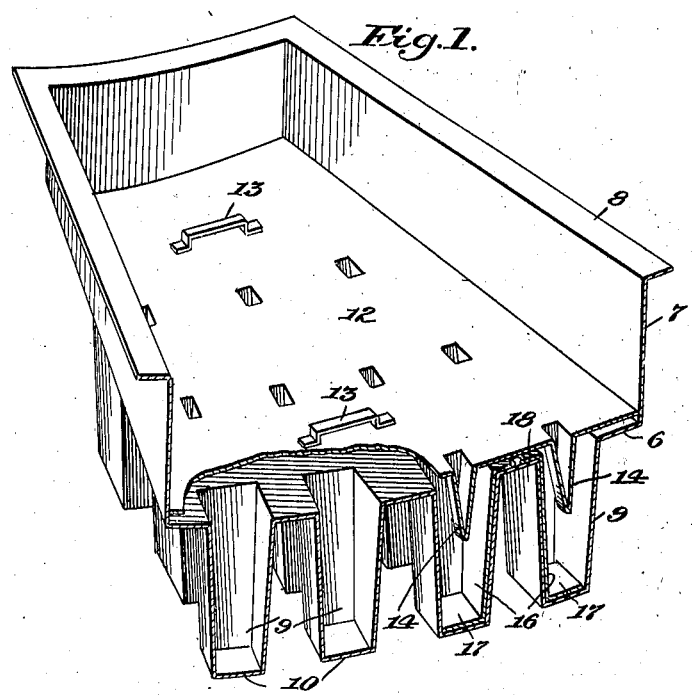
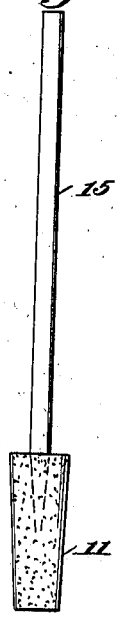
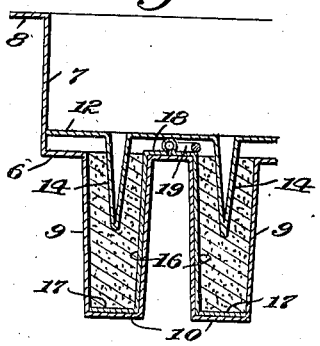
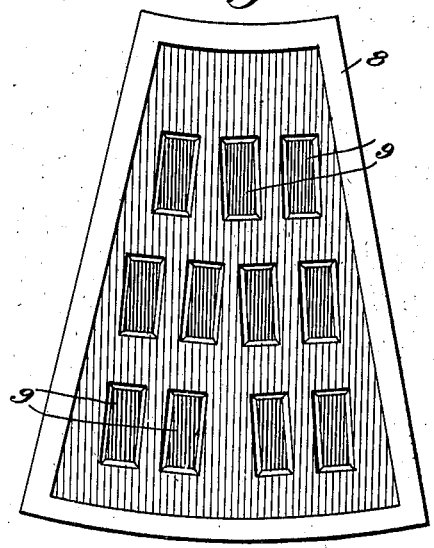
Inventor:
Frank C. Fernandez,
By Dwight B. Galt
Att'y.

Patented May 13, 1930

1,758,567

UNITED STATES PATENT OFFICE

FRANK C. FERNANDEZ, OF TUCSON, ARIZONA

METHOD AND APPARATUS FOR MAKING FROZEN CONFECTIONS

Application filed August 12, 1927. Serial No. 212,511.

This invention relates to method and apparatus for making frozen confections of that type wherein an edible substance or commodity is frozen or congealed and mounted or arranged upon a stick, edible or otherwise, from which the confection may be eaten.

In processes heretofore employed, it has been proposed to freeze the edible substance with the stick or holder partly immersed therein, so that after the freezing operation is complete, the commodity may be removed with the handle firmly embedded therein. There have arisen objections to this process, and I have found that the commodity may be produced more economically, with greater facility, and in a more sanitary manner by first freezing the commodity, in the manner hereinafter specified, and subsequently applying thereto the handle or stick from which the frozen confection may be eaten.

My improved process is carried out in the manner hereinafter particularly detailed and more properly with the specific apparatus to which reference will be made.

In the drawings:

Fig. 1 is a fragmentary perspective view of a freezing tray or pan preferably used in carrying out the process forming a part of my invention.

Fig. 2 is a top plan view of the tray.

Fig. 3 is a fragmentary detailed sectional view on a slightly enlarged scale taken through a part of the tray.

Fig. 4 is a side elevation illustrating the general appearance of the commodity produced by my improved method, and Fig. 5 is a detailed perspective view of an elevating stirrup used in carrying out the invention.

In accordance with my process, the mold for the frozen confection includes a tray 6, formed of thin sheet metal and of a size and shape to be applicable to the type or style of refrigerating apparatus with which it is to be used. In the present instance, this tray is shaped to form a segment of a circle, so as to be applicable to a cylindrical type of refrigerating machine. This tray has upstanding side and end walls 7, from the upper edges of which are outwardly projecting flanges 8 to rest upon a part of the refrigerating apparatus to maintain the bottom part of the pan submerged in the brine or other refrigerating medium. The bottom of the tray is provided with molds indicated generally at 9, which comprise depressed portions in the tray bottom of the size and shape it is desired that the commodity shall be made. In order that the frozen confections may be removed from the molds with facility and with least likelihood of breaking the same, these molds have their side and end walls converging downwardly as indicated, and the bottoms 10 of the molds are flat and connect the side and end walls. The mold so shaped will produce a confection of the general shape and character represented at 11 in Fig. 4, and it is apparent that the size may be varied according to requirements. While the mold herein shown and described constitutes the preferred form, it is apparent that its shape may be changed if desired. For instance, the molds may be of frusto-conical shape, which would lend themselves admirably to the process involved.

Associated with the tray and molds is a cover plate 12 of approximately the same size and shape as the interior of the tray, or of such size and shape as to permit of its ready application and removal. This cover plate may be constructed of thin sheet metal, and is provided with handles 13 at proper places to permit of its ready manipulation. The cover plate is provided with a series of depressed spurs 14 of comparatively shallow depth, and positioned upon the cover plate in such manner that when the latter is placed within the tray, each spur will project down centrally within its respective mold depending from the bottom of the tray. These spurs are of substantially wedge-shape with their apices lowermost.

In practice, the tray with its various molds filled to a proper height with the commodity to be frozen is set down into the refrigerating apparatus, whereupon the cover plate 12 is applied in the manner shown in Fig. 1. The refrigerating process then proceeds, and when completed the cover plate is lifted from the tray. This leaves the frozen confections within their respective molds, each with a wedge-shaped recess in its upper end. Handles 15 may then be inserted in these wedge-shaped openings, being thus assured of proper centering, and it is preferred that one end of the handle or stick be cut to practically wedge-shape to properly fit within the recess in the confection. These handles may be moistened as desired just prior to their application to the confection, and refrigeration then proceeds until such time as the handles become thoroughly frozen or "set" within their respective confections. The commodities may then be removed either by withdrawing them by means of their handles, or the mold portions of the tray may be immersed in water momentarily to produce a slight thawing, whereupon the commodities may be readily withdrawn from their molds. By shaping the molds with a downward taper as shown and described, there is no tendency toward the creation of a partial vacuum beneath the commodity in the operation of removal, so that this operation is greatly facilitated. This advantageous effect is likewise accompanied where the molds are of substantially frusto-conical shape, as above referred to.

As an expedient in further facilitating removal of the frozen confections from their molds, use may be made of an elevator or lifter of the general arrangement shown in the drawing. This lifter comprises a stirrup formed of thin sheet metal and shaped so as to straddle the intervening metal between a pair of molds. The stirrup therefore comprises legs 16 of a length and breadth substantially equal to the depth and breadth of a mold and having outturned flanges or feet 17 at their lower ends corresponding substantially to the shape and size of the mold bottoms 10. The bight portion 18 of the stirrup has attached thereto a bail 19 capable of being raised or lowered and to enable the stirrup to be grasped and handled. These stirrups are applied prior to the introduction of the liquid mold contents, whereupon the bails 19 are turned down so as not to interfere with the proper application of the cover plate 12. After the freezing process the bails 19 are grasped and lifting action is applied, which results in the frozen confections being bodily lifted from the molds without danger whatever of cracking or breaking the same.

From the foregoing description, it is apparent that I have provided a process for the production of frozen confections of the "sucker" of "lollypop" type which greatly facilitates production and dispensing in large quantities with a minimum of effort and with small likelihood of damage to or distortion of the commodities when being removed from their molds or in the handle applying operations. It will be understood, however, that notwithstanding the specific mechanism herein referred to, the process may be carried forth with equal facility by other mechanical devices.

Having thus described my invention, I claim:

1. The process of making frozen confections which consists of subjecting liquid to intense refrigeration and at the same time forming a cavity therein, and subsequently applying to such cavity and freezing therein the end of a stick.

2. In an apparatus for making frozen confections, a tray, a pair of molds carried by and depending from said tray, a stirrup comprising a bight portion and legs, said legs extending one into each of said molds with the bight portion in the space between the molds and entirely out of the molds, laterally deflected feet at the lower ends of said legs resting upon the bottoms of said molds, and a bail secured to said stirrup at its intermediate portion.

3. A lifter for ice cream molds, comprising a bight portion and a pair of legs adapted one each to extend into adjacent molds, an outwardly projecting foot at the lower end of each leg, and a lifting bail carried by the said bight portion.

4. In combination, a tray having a plurality of hollow molds depending therefrom, a stirrup for each pair of molds, a bail on each stirrup extending above the upper surface of said tray, a plate in said tray resting upon said bail, and hollow spurs depending from said plate and extending into said molds.

In testimony whereof I affix my signature.

FRANK C. FERNANDEZ.